Figure 1:
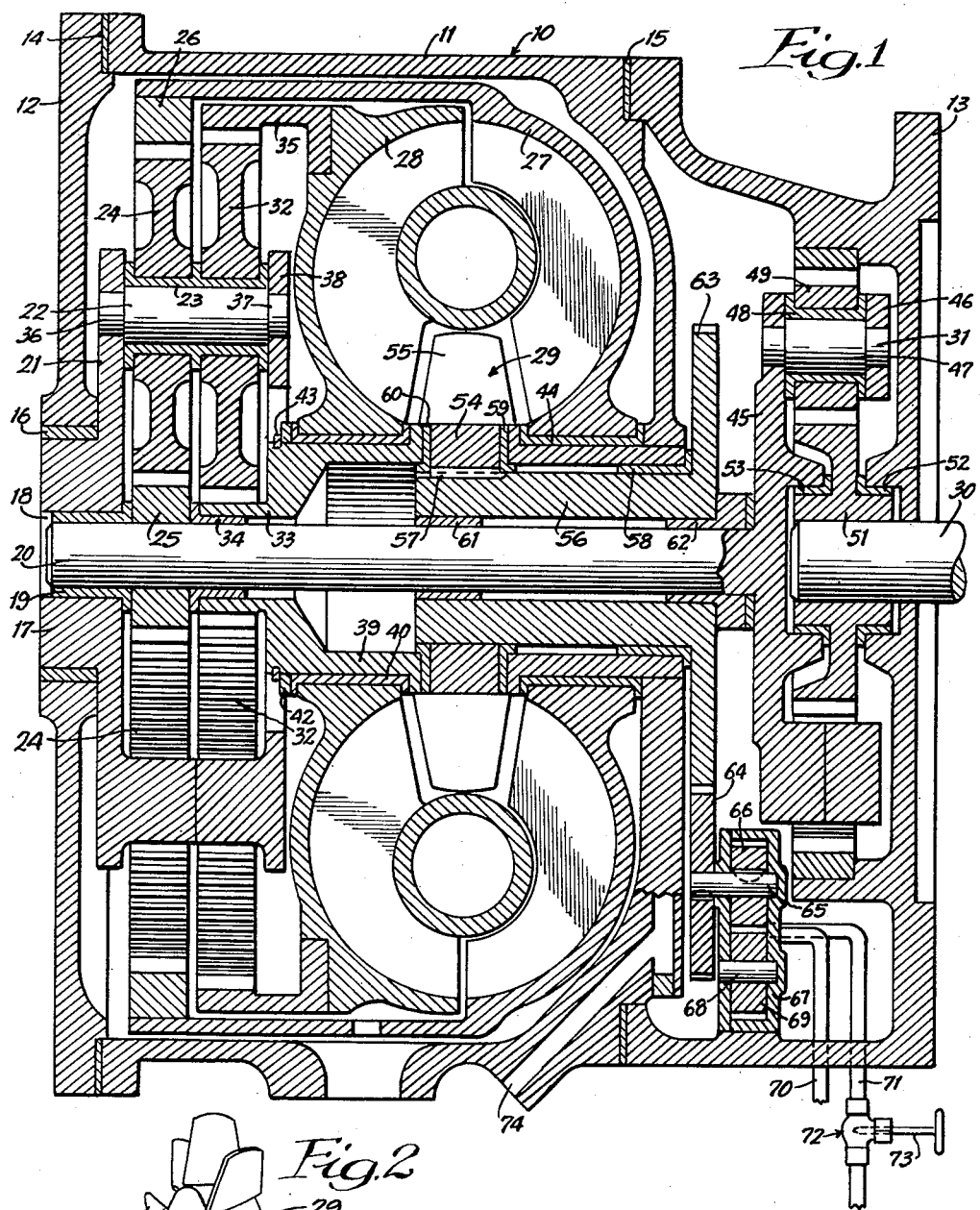

Sept. 6, 1960                F. A. GLOMB ET AL                2,951,398
               HYDRO-KINETIC VARIABLE SPEED CONTROLLER
                        Filed Nov. 15, 1956

INVENTORS:
Frank A. Glomb,
Frank J. Acton and
Enrico P. Mercanti,
BY John W. Graham
            ATTORNEY.

United States Patent Office 2,951,398
Patented Sept. 6, 1960

2,951,398

HYDRO-KINETIC VARIABLE SPEED
CONTROLLER

Frank A. Glomb and Frank J. Acton, Park Forest, Ill.,
and Enrico P. Mercanti, Manhattan, Kans., assignors
to Barnes & Reinecke, Inc., Chicago, Ill., a corporation of Delaware Filed Nov. 15, 1956, Ser. No. 622,433

13 Claims. (Cl. 74—677)

This invention relates to speed control apparatus, and more especially to a hydro-kinetic speed controller. Even more particularly, the invention is concerned with an infinitely variable speed transmission device of the type employing a pump for driving a turbine, and which is provided with means for changing the nature of the fluid flow therein so that the intrinsic speed relationships are subject to control.

Hydro-kinetic transmissions, as generally known in the art, comprise a primary wheel or pump, a secondary wheel or turbine, and a reaction member. An examination of such units establishes that the performance curves therefor show that the secondary wheel or turbine speed is in all cases uniquely proportional to the primary wheel speed. Therefore, for each unit, a given pump or impeller speed defines a turbine speed. Hence, it is apparent that such units will not be able to maintain a constant output speed through a predetermined range of input speeds.

It has been discovered that the intrinsic speed relationships which exist in conventional hydro-kinetic units may be negated and subjected to external control through the introduction of an additional parameter which is capable of changing the nature of the fluid flow through the hydraulic circuit of the apparatus. For example, if the angle of the blades in any one of the basic converter elements could be made continuously variable, the single fixed relationship between impeller and turbine speed would be voided. However, because of the rotation of the impeller and turbine wheels, it is impractical to attempt to change blade positions in these elements during operation of the apparatus, and some other control means must be provided to change that fixed relationship.

It is, accordingly, an object of this invention to provide in a hydro-kinetic transmission of the character described a means for negating the intrinsic speed relationships thereof which exist between turbine and impeller wheels, whereby a constant output speed can be maintained through a range of input speeds. Still another object is to introduce in hydro-kinetic transmission devices—wherein the torque converter performance is influenced by various parameters such as primary torque, secondary torque, torque ratio, efficiency, etc.—an additional parameter capable of negating the fixed relationship of those various parameters.

Yet another object is that of providing in a torque conversion unit having a pump or primary wheel, a secondary or turbine wheel, and a reaction member—means for changing the character of the reaction member so that the output speed of the apparatus is constant through a range of input speeds. Yet another object is that of providing a hydro-kinetic transmission capable of transmitting variable power at any given driver or engine speed, but, however, one that is adjustable to the end that when set to supply a constant output speed at any given engine or input speed, a definite torque ratio will be established whereby irrespective of the magnitude of the power transmitted, the torque ratio across the transmission will remain the same—independent of power—thereby requiring no additional adjustment to take care of variations in transmitted power.

Still a further object is to provide a transmission of the character described having a pump, turbine and reaction member, and in which the only parameter requiring control to effectuate a constant output speed is the reaction member so that absolutely no mechanical shifting of gears will be necessary during operation of the apparatus, and there will be no change of oil pressure in the hydraulic fluid flow rate in the transmission.

A further object of the invention is to provide a hydro-kinetic converter of the character described wherein the reaction member comprises a plurality of vanes rotatable through a predetermined arc and wholly independent of the pump and turbine members thereof, whereby the coupling between the pump and turbine is a function of the rotational speed of the reaction member so that the predetermined or intrinsic parameters of the apparatus can be obviated and negated by the variable parameter of the reaction member.

Yet a further object is in the provision of a hydro-kinetic speed transmission having a rotatable pump, a rotatable turbine, and a reaction member which is characterized by comprising a rotatable ring equipped with spaced apart vanes and with means for controlling the rotational speed of the ring, whereby the coupling between the pump and turbine is variable, being dependent upon the rotational velocity of the reaction member, with the result that the transmission is made to have a constant output speed for a given range of input speeds. Yet a further object is in the provision of pump means—a gear pump, for example—connected in hydraulic circuit with the rotatable ring, and wherein metering means are provided in circuit therewith for limiting the flow of hydraulic fluid through the pump, to the end that the rotational velocity of the reaction member is controlled thereby. Additional objects and advantages will become apparent as the specification develops.

Figure 2:
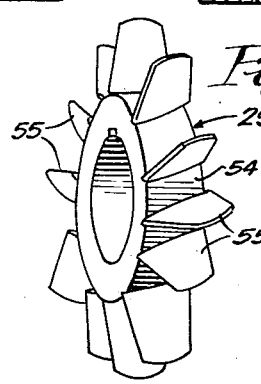

An embodiment of the invention is illustrated in the accompanying drawing, in which:

Figure 1 is a longitudinal sectional view through transmission apparatus embodying the invention; and Figure 2 is a perspective view of the vane-equipped rotatable ring.

The functional components of the speed controller are contained within a housing designated generally with the numeral 10, and which comprises a central section 11 and end closures therefor 12 and 13. The input to the converter is adjacent the end closure wall 12, while the output is taken at the closure wall 13. The three casing components may be secured together by bolts or cap screws in a conventional manner, and preferably gaskets 14 and 15 will be interposed between the end walls and casing sections to form a fluid-tight seal therebetween.

Rotatably supported in bearings 16 carried by the end wall 12 is an input member or engine drive adapter 17 which, as the name indicates, is adapted to be coupled to an engine so as to be positively driven thereby. The adapter member 17 has a relatively large diameter, and concentric about the rotational axis thereof is an opening 18 therethrough in which is positioned a bearing 19 that provides a rotatable mounting for a drive shaft or output driver 20 that extends longitudinally of the casing 10.

The drive adapter 17 has a laterally extending annular flange 21 projecting outwardly therefrom generally along the inner side of the closure wall 12. The flange carries, at spaced apart points circumferentially thereabout with respect to the rotational axis thereof, a plurality of planetary arms 22—there being three in number in the specific illustration given. The planetary arms 22 are coaxial with the shaft 20 and with the rotational axis of the adapter 17, and extend generally in a parallel relation with the shaft 20. Rotatably supported upon a bearing 23 carried by each planetary arm 22 is a planetary gear 24. The gear 24 meshes with a sun gear 25 which is carried by the shaft or alternator driver 20 so as to cause the same to rotate. That is, the planetary gear 24 drives the sun gear 25, which in turn rotatably drives the shaft 20. The planetary gear 24, in turn, is driven by ring gear 26 which is connected to and is driven by turbine or secondary wheel 27 which comprises a part of the fluid converter, the other parts being the pump or primary wheel 28 and the reaction member which is designated generally with the numeral 29.

The gear train just described is the coupling between the turbine and shaft 20 which, as has been brought out, drives the output or alternator shaft 30 of the device through a speed reducer assembly designated in toto with the numeral 31. It has been described prior to the description of the gear train coupling the engine adapter 17 with the pump 28 simply because in a structural progression from left to right in Figure 1, it appears first. The input gear train will now be described.

Also rotatably supported on the bearing 23 of each planetary arm 22 is a planetary gear 32 that meshes with a sun gear 33 coaxial with the shaft 20 and which rotatably supports that shaft by means of a bearing 34. At its outer side, the planetary gear 32 meshes with a ring gear 35 which is connected to the pump or primary wheel 28 of the converter unit. Thus, rotation of the planetary arms 22 about the shaft 20 drives the ring gear 35, which in turn drives the pump 28.

It will be apparent from the drawing that the planetary arms 22 have reduced end portions 36 and 37 that are received, respectively, in the flange 21 and corresponding flange ring 38 of the adapter 17. Also, it will be seen that the sun gear 33 is a fixed member, being provided by an internal casing part 39 formed integrally with the central casing section 11 as through bridging elements (not shown) of inverted, generally U-shaped configuration spanning the reaction member 29. The pump 28 is rotatably suported on the internal casing section 39 through bearings 40 and 41, and movement of the pump toward the left as viewed in Figure 1 is constrained by a washer member 42 positioned about the casing portion 39, and which is held in place with respect thereto by a snap ring 43. The turbine 27 is also rotatably supported by the casing part 39 through a bearing 44 interposed therebetween.

The shaft 20 at the output end thereof is provided with a laterally extending flange 45 that may be formed integrally therewith, as shown, which has a corresponding flange portion 46 spaced therefrom. Rotatably supported at circumferentially spaced points concentric with the rotational axis of the shaft 20 and output shaft 30 are a plurality of gear axles 47, each of which is equipped with an external bearing 48 having mounted thereon a planetary gear 49. The gear 49 meshes with a ring gear 50 carried by the casing part 13, and it meshes also with a sun gear 51 which is fixed on the output or alternator shaft 30, and is rotatably supported by the casing part 13 and flange 45 on bearings 52 and 53, respectively. The gears 48, 50 and 51 comprise a gear reducer for driving the output or alternator shaft 30 at a rotational velocity less than that of the internal shaft or alternator driver shaft 20.

As is shown most clearly in Figure 2, the reactor 29 comprises an annular mounting ring 54 equipped with a plurality of control vanes 55. The control vanes 55 may be secured to the ring in any suitable manner, and for example, might be welded in position thereon. It is clear that the vanes 55 are spaced apart circumferentially about the ring, and those control vanes provide the reaction members which control the coupling between the pump 28 and turbine 27.

The ring 54 has an opening extending centrally therethrough that receives a gear 56 therein, and it is held rotatably rigid with respect to the gear by a key 57.

The gear 56 along the hub thereof is rotatably supported within the casing section 39 by bearings 58, 59 and 60. The gear is centrally hollowed to permit the shaft 20 to extend therethrough, and relative rotation between the shaft and gear is afforded through the bearing members 61 and 62.

The flange of the gear 56 is equipped with teeth 63 that mesh with the teeth of a gear 64 keyed on a shaft 65 having also keyed thereon a pump gear 66 mounted within a gear pump housing 67 that also rotatably supports therein on a shaft 68 a pump gear 69. The casing 67 is rigidly secured to the housing of the converter 10, and the pump gears 67 and 69 mesh in a conventional manner to function in the same way as any other gear pump. The shafts 65 and 68 are rotatably journalled in the casing 67.

The pump gears 66 and 69 are supplied with fluid through a conduit 70 communicating therewith through the pump casing 67; and those pump gears force such fluid supplied thereto under pressure through an outlet conduit 71 equipped with a control means 72 such as a manually controlled needle valve 73. It will be apparent that the supply conduit 70 at its other end will communicate with a supply of fluid and, for example, may terminate within the casing of the converter 10 and receive its supply of fluid from therein. It will be appreciated that the resistance to the pumping action or rotation of the pump gears 66 and 69 will depend upon the freedom with which fluid is pumped therefrom through the discharge conduit 71 and, therefore, it will depend upon the setting of the needle valve 73. As a result, since those gears are driven by the gears 64 and 56 and therethrough by the reactor 29, the resistance to rotation of the reactor can be controlled by adjusting the needle valve 73.

Skipping for the moment the manner in which adjustment of the vanes 54 affects the coupling between pump 28 and turbine 27, it may be stated simply that as the pump rotates, it drives the turbine. As the turbine rotates, it rotates the ring gear 26 which is rigidly connected thereto, and the ring gear in turn tends to rotate the planetary gears 24 as those gears are revolved by the planetary arms 22 about the rotational axis of the engine adapter 17. The planetary gears 24 being in mesh with the sun gear 25 causes that gear to rotate, and it in turn rotates the internal shaft or alternator driver 20 to which it is rigidly secured.

It is desired to maintain the angular velocity of the sun gear 25 constant so that the velocity of the output or alternator shaft 30 remains constant through a wide range of speed change in the adapter 17. To accomplish this result—or namely, the result of maintaining the angular velocity of the sun gear 25 constant so that the output speed of the shaft 30 is constant—the turbine 27 through adjustment of the reactor member 29 functions to modulate the speed of the planetary gears 24.

The internal shaft 20 drives the output shaft 30 through the gear reducer 31, which functions in a conventional manner to effectuate a speed reduction. The particular gear train employed to accomplish the reduction is a planetary system, as has been described in detail.

The reactor 29 functions to modulate the speed of the planetary gear 24 to the end that the sun gear 25, internal shaft 20 and output shaft 30 are all rotated at a speed that is constant even though the input speed or speed of the drive adapter 17 varies through a relatively wide range. The reactor achieves the modulation by changing the coupling between the pump 28 and turbine 27 so that the effectiveness of the coupling is diminished progressively as the speed of the input member or adapter 17 is increased.

The particular manner in which the reactor member 29 effectuates the change in coupling is through a change in the rotational velocity of the reactor member. The reactor member will tend to be forced into rotation by the fluid accelerated from the pump 28 and into the turbine 27, for such fluid flows over the vanes 55 of the reactor member. The vanes 55 are oriented so that the resultant of the fluid forces acting thereon will be in a direction causing rotation of the reactor.

As has been brought out before, rotation of the reactor will cause the gear 56 to rotate since the reactor and gear are locked together by the key 57, and in turn the gear 64 will be progressively driven, as will the pump gear 66. The pump gear 66 will positively rotate the pump gear 69, with the result that fluid will be drawn into the pump through the inlet or conduit 70 and will be expelled therefrom through the outlet or conduit 71. If the reactor member 29 is free to rotate, very little of the force of the fluid passing over the blades 55 thereof will be expended, and substantially all of that fluid force will be directed into the vanes of the turbine 27 and will be expended in rotating the turbine. Therefore, maximum coupling between the pump 28 and turbine 27 is achieved when the rotor is free to rotate—or, stated another way, when there is little resistance to the flow of fluid from the gear pump, which of course in the illustration given is dependent upon the setting of the needle valve 73. On the other hand, if there is relatively great resistance to free rotation of the reactor member 29, a considerable portion of the energy in the fluid passing over the vanes will be expended in attempting to rotate the reactor. Thus, there will be a decrease in the coupling between the pump 28 and turbine 27, and such a decrease can be achieved by regulation of the needle valve 73 so as to restrict the conduit 71.

In the illustration set forth in the drawing, the gear pump is controlled by the needle valve 73. The controlled reaction or adjustment of the gear pump may be accomplished by any other suitable means which ordinarily will be an automatic control system—a servo system, for example, which is made sensitive to the speed of the output or alternator shaft 30. With such an arrangement, the discharge passage from the gear pump will be automatically restricted or be opened to a greater extent as is necessary to control the fluid coupling between the pump 28 and turbine 27 for the purpose of maintaining a constant output velocity for the shaft 30 which, as has been brought out, is one of the objects of this invention.

The gear train comprising the input planetary system of gears 32, 33 and 35 is a speed increaser gear train which functions to rotate the pump 28 at a speed exceeding that of the input adapter 17, whereby at least at one predetermined input speed of the adapter 17 the output shaft 30 rotates at the same speed, the increased rotational speed of the pump 28 being compensated for in the inherent slippage in the converter unit comprising the pump, turbine and reactor members.

The unit illustrated and described is a closed system whereby the hydraulic fluid within the unit is returned from the output side to the input side thereof, preferably by means of an external return conduit (not shown) which may be connected to the passage 74 through the casing section 11. However, either an open or a closed circuit may be employed, and substantially the only differences will be in the shock losses and fluid friction losses of the two systems. Therefore, for the same performance, the setting of the vanes 55 may differ between an open and closed circuit. Generally, improved performance is attained in a closed circuit, for with a given input speed and torque, a higher driving torque is available at the same converter speed ratio.

A definite torque ratio is established across the unit whenever the position of the vanes 55 is set for any given engine speed so as to supply the constant output speed required. Therefore, regardless of the magnitude of the power transmitted, the torque ratio across the converter remains the same—independent of power—thereby requiring no additional vane control to take care of transmitted power variations.

In order to maintain high values of speed ratio, a planetary gear train in the alternator drive is used. A direct drive without the use of any planetary gears would be possible except that the efficiency drops to a relatively low value (for example, a value less than 33% at the low engine speed of 3,000 r.p.m.), at a low engine or input speed, and it is beneficial then to maintain the speed of the runner or turbine as close as possible to that of the impeller or pump speed.

While in the foregoing specification an embodiment of our invention has been described in considerable detail for purposes of illustration, it will be readily apparent to those skilled in the art that numerous changes may be made in those details without departing from the spirit and principles of the invention.

We claim:

1. In a hydro-kinetic speed controller of the character described, a casing having an input shaft and an output shaft both journalled for rotation therein, a fluid torque converter supported by said casing, gear train means mounted within said casing in driving relation between said input and output shafts, said torque converter being interposed between certain of the elements in said gear train means for controlling the coupling therebetween, reactor means comprising a component of said torque converter and being continuously rotatable about the axis thereof, and means for controlling the speed of rotation of said reactor means for selectively adjusting the coupling of said torque converter as defined thereby for modulating the coupling thereof between the aforesaid elements of said gear train means to maintain a relatively constant rotational velocity of said output shaft throughout a range of velocities of said input shaft.

2. In a speed control unit of the character described having input and output shafts, the first of which is adapted to be rotated through a range of velocities while it is desired to maintain the speed of the output shaft relatively constant, coupling means interposed between said input and output shafts for rotating the latter in response to rotation of the former, said coupling means including a gear train and fluid torque converter, said fluid torque converter having input and output members and a reactor member continuously rotatable about the axis thereof, and means for adjustably controlling the speed of rotation of said reactor member for regulating the effectiveness of the coupling between the input and output members so as to progressively decrease the effectiveness of said coupling in response to an increase in the rotational velocity of said input shaft and vice versa to the end that the velocity of said output shaft remains relatively constant.

3. The apparatus of claim 2 in which said gear train comprises parallel sections, one for driving the input mmeber of said torque converter and the other being driven by the output member of said torque converter.

4. The apparatus of claim 3 in which said parallel gear train sections are each a planetary gear train.

5. The apparatus of claim 2 in which said torque converter comprises a pump and turbine respectively disposed along opposite sides of said reactor member and said reactor member is rotated by the flow of fluid thereover from said pump to said turbine, and in which fluid flow means in combination with said reactor member are provided for controlling the rotational velocity thereof.

6. The apparatus of claim 5 in which said fluid flow means comprises a gear pump driven by said reactor member, and control means in the output of said gear pump for regulating the flow of fluid therefrom whereby controlled resistance to the rotation of said reactor member is provided.

7. In a hydro-kinetic speed controller device of the character described, a casing, an input and an output shaft journalled in said casing for rotation, a fluid torque converter having input and output elements, gear train means drivingly connecting said input shaft with the input element of said torque converter, additional gear train means drivingly connecting the output member of said torque converter with said output shaft, said torque converter including a reactor member for establishing the degree of coupling between the input and output members thereof, said reactor member being rotatable and the speed thereof being adjustable to provide selective control over the degree of coupling between said input and output members, and means for adjusting the speed of rotation of said reactor member so that the speed of said output shaft can be maintained at a relatively constant value throughout a range of input speeds imparted to said input shaft.

8. The apparatus of claim 6 in which said reactor member comprises a ring rotatably supported within said casing and a plurality of circumferentially spaced vanes secured to said ring and being rotatable therewith.

9. The apparatus of claim 6 in which the gear train between said input shaft and the input member of said torque converter provides a rotational speed for the input member of said torque converter that exceeds the speed of said input shaft to accommodate inherent losses in said torque converter.

10. In a hydro-kinetic variable speed controller providing an infinitely variable speed transmission device, a hydraulic torque converter having a pump, turbine, and reactor, said reactor member comprising a rotatable ring equipped with a plurality of vanes, means for providing adjustable resistance to the rotation enforced on said ring by the fluid forced over said vanes in flowing from said pump to said turbine whereby the degree of coupling between the pump and turbine is controlled in accordance with the speed of said ring as determined by the adjustment of said resistance, input means including a planetary gear train operatively connected with said pump for driving the same, and output means including a planetary gear train operatively connected with said turbine and being driven thereby to provide the output for said speed controller, said planetary gear trains being operative to maintain the pump and turbine speeds at approximately the same values at relatively low input speeds by increasing the efficiency of said device at such speeds.

11. A fluid torque converter comprising a pump, turbine and reactor member, said pump and turbine being each equipped with vanes and being mounted for rotation about a common axis, said reactor member comprising a ring supported for complete rotation about the aforesaid axis and being equipped with a plurality of spaced apart vanes interposed between said pump and turbine, said reactor member being freely rotatable in response to the resultant forces developed on the vanes thereof by the fluid impinging thereon in moving from said pump to said turbine, and means for adjustably resisting rotation of said reactor member in the direction enforced thereon by such fluid impingement to regulate the speed of rotation thereof whereby the coupling between said pump and turbine is controlled thereby.

12. In a hydro-kinetic variable speed controller having a rotatable input shaft and a rotatable output shaft, a hydraulic torque converter having a pump, turbine and reactor, said reactor comprising a rotatable ring equipped with a plurality of vanes disposed in the path of fluid flowing from said pump to said turbine, means for providing adjustable resistance to the rotation enforced on said ring by the fluid forced over said vanes in flowing from said pump to said turbine whereby the degree of coupling between said pump and turbine as determined by said reactor and the rotational speed of the ring thereof is controlled in accordance with the adjustment of said resistance, an input gear train connecting said input shaft with said pump for driving the same, and an output gear train connecting said turbine with said output shaft for driving the same, said gear trains being operative to maintain the pump and turbine speeds at approximately the same values at relatively low input speeds.

13. The speed controller of claim 12 in which fluid pressure means are provided in operative association with said reactor for adjusting the resistance to rotation thereof.

References Cited in the file of this patent

UNITED STATES PATENTS

| | | |
|---|---|---|
| 1,873,200 | Hedstrom | Aug. 23, 1932 |
| 2,292,482 | Roche | Aug. 11, 1942 |
| 2,361,105 | Jandasek | Oct. 24, 1944 |
| 2,595,628 | Baule | May 6, 1952 |
| 2,707,539 | Marble | May 3, 1955 |

FOREIGN PATENTS

| | | |
|---|---|---|
| 423,187 | Great Britain | Jan. 28, 1935 |